Patented July 27, 1926.

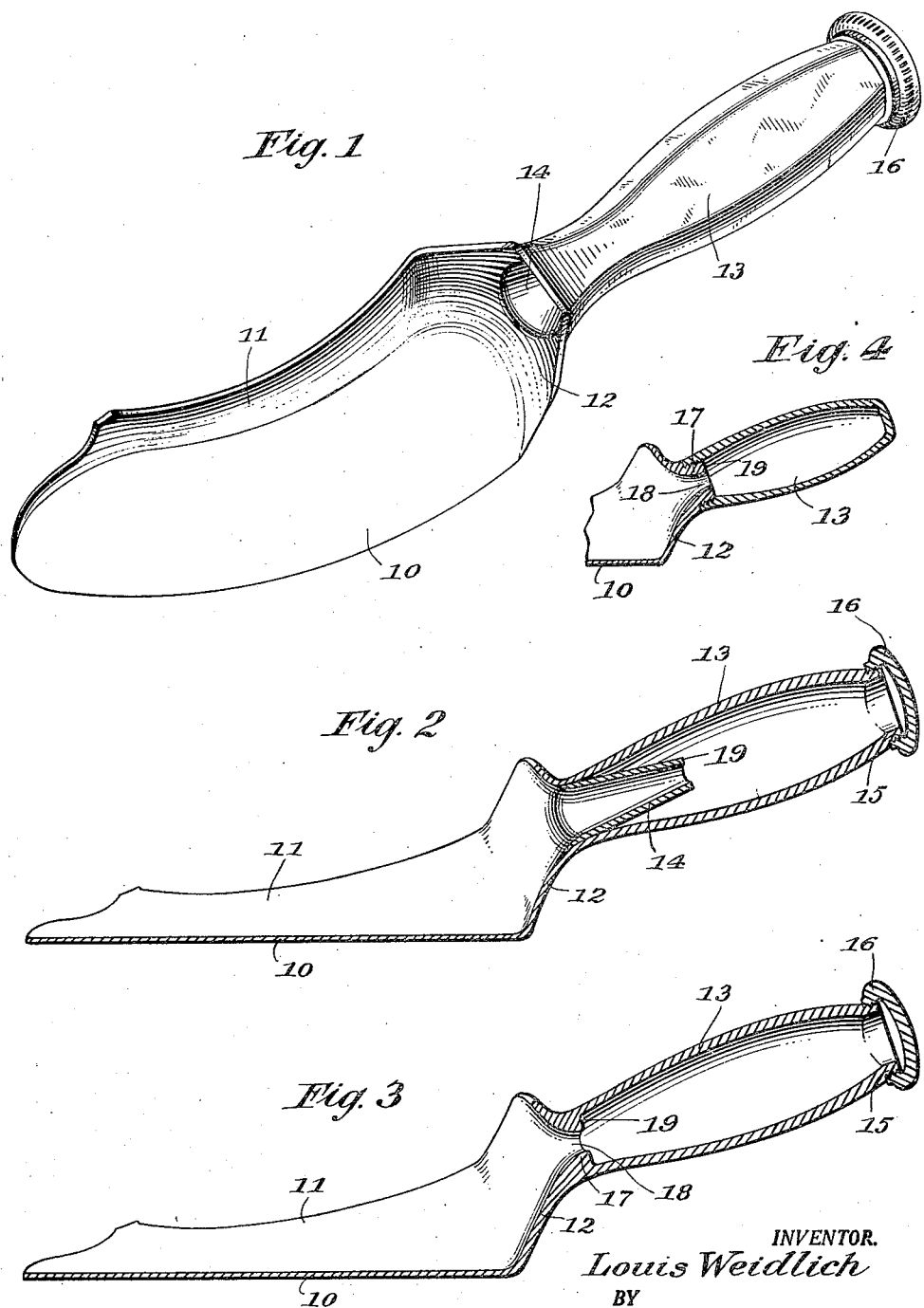

1,593,609

UNITED STATES PATENT OFFICE.

LOUIS WEIDLICH, OF STRATFORD, CONNECTICUT.

TABLE CRUMBER.

Application filed July 11, 1925. Serial No. 42,908.

The present invention relates to an improved table crumber, and has for an object to provide a device of this character including a receptacle portion into which an accumulation of crumbs may be stored, so as to prevent them from being spilled as the crumber is carried from place to place, and thereupon conveniently removed; the device being furthermore capable of being carried in any position, as for instance hanging, without spilling the crumbs. The device may therefore being advantageously used either in households or restaurants.

A further object is to provide a device of this character of simple construction and free of springs or freely movable parts.

With the above and other objects in view, embodiments of the invention are shown in the accompanying drawings, and these embodiments will be hereinafter more fully described with reference thereto, and the invention will be finally pointed out in the claims.

In the drawings:—

Fig. 1 is a perspective view of a table crumber, according to one embodiment of the invention;

Fig. 2 is a longitudinal sectional view thereof;

Fig. 3 is a longitudinal sectional view of a modified form of construction, and

Fig. 4 shows a longitudinal section of a further modified form of the invention.

Similar reference characters indicate corresponding parts throughout the several figures of the drawings.

Referring to the drawings, and more particularly to Figs. 1 and 2 thereof, the device, according to the embodiment of the invention shown therein, comprises a flat blade or scoop portion 10 provided along its rear edge with an upwardly bent retaining flange 11, and having formed at one end a cupped wall portion 12 extending into a hollow handle 13, said wall portion surrounding the inner open end of the handle in the manner of a funnel.

Within said inner open end of the handle there is secured, by soldering or the like, a tapered tube 14 having its reduced end extending into the handle in spaced relation to its interior surface to form a trap structure. The outer end of the handle is threaded exteriorly, as at 15, and is provided with a removable screw cap 16.

In operation the crumbs are scooped up in the portion 10, and by tilting are passed into the hollow handle through the tube 14 where they are trapped against return movement to the scoop irrespective of the position in which the device is held. The accumulation of crumbs within the handle may be readily removed by simply unscrewing the cap 16 and pouring them out.

In Fig. 3 I have illustrated a modified form of the invention, in which the open inner end of the handle is provided with a thickened flange 17 having a reduced inlet opening 18 to the handle through which the crumbs may be passed from the blade to the handle, and which forms a trap to prevent return movement of the crumbs.

The modification shown in Fig. 4 illustrates the handle 13 threadably attached to the thickened flange 17 of the scoop shank 10 and whereby the handle, instead of a cap, may be detached for the removal of the crumbs. This construction includes the reduced inlet opening 18 for the entrance of the crumbs to the hollow handle and produces the annular wall 19 around the opening which together with said opening form a trap that prevents the crumbs from rolling out.

I have illustrated preferred and satisfactory embodiments of the invention, but it will be obvious that changes may be made therein within the spirit and scope thereof, as defined in the appended claims.

Having thus described my invention, what I claim and desire to secure by Letters Patent is:—

1. A crumber including a scoop, a hollow handle having one end open to said scoop, a tapered portion in said end and having its reduced end disposed within said handle in spaced relation to its interior to form a trap.

2. A crumber including a scoop, a hollow handle having one end open to said scoop, a tapered portion in said end and having its reduced end disposed within said handle in spaced relation to its interior to form a trap, and a removable cap at the other end of said handle.

3. A crumber including a scoop having a side wall and tapered tubular portion extended therefrom, a hollow handle enclosing said tapered tubular portion in a manner to receive crumbs through said tubular portion and means for allowing said crumbs to be removed from said handle.

Signed at Bridgeport in the county of Fairfield and State of Connecticut this 30th day of June A. D. 1925.

LOUIS WEIDLICH.